(12) United States Patent
Altman et al.

(10) Patent No.: US 7,325,124 B2
(45) Date of Patent: Jan. 29, 2008

(54) SYSTEM AND METHOD OF EXECUTION OF REGISTER POINTER INSTRUCTIONS AHEAD OF INSTRUCTION ISSUE

(75) Inventors: Erik Altman, Danbury, CT (US); Michael Karl Gschwind, Chappaqua, NY (US); Jude A. Rivers, Cortlandt Manor, NY (US); Sumedh Wasudeo Sathaye, Lagrangeville, NY (US); John-David Wellman, Hopewell Junction, NY (US); Victor Zyuban, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 10/828,794

(22) Filed: Apr. 21, 2004

(65) Prior Publication Data

US 2005/0251654 A1   Nov. 10, 2005

(51) Int. Cl.
*G06F 9/30* (2006.01)
(52) U.S. Cl. .................................... 712/216
(58) Field of Classification Search ............... 712/216
See application file for complete search history.

(56) References Cited

U.S. PATENT DOCUMENTS

| | | | | |
|---|---|---|---|---|
| 3,946,366 A | | 3/1976 | Edwards, Jr. | |
| 5,590,352 A | * | 12/1996 | Zuraski et al. | 712/23 |
| 5,765,035 A | * | 6/1998 | Tran | 712/216 |
| 5,890,222 A | | 3/1999 | Agarwal et al. | |
| 5,930,491 A | * | 7/1999 | Hilgendorf et al. | 712/209 |
| 5,974,524 A | | 10/1999 | Cheong et al. | |
| 6,052,766 A | | 4/2000 | Betker et al. | |
| 6,687,808 B2 | | 2/2004 | Sugimoto | |

OTHER PUBLICATIONS

Patterson, David. Hennessy, John. "Computer Architecture: A Quantitative Approach". Morgan Kaufmann Publishers, Third Edition, May 17, 2002. pp. 184-189.*
J. H. Moreno et al. An Innovative Low-power High-performance Programmable Signal Processor for Digital Communications; IBM J. Res. & Dev. vol. 47 No. 2/3 Mar./May 2003; pp. 299-326.
H. Hunter et al.; A New Look at Exploiting Data Parallelism in Embedded Systems: Cases, 2003; 11 pages.

* cited by examiner

*Primary Examiner*—Eddie Chan
*Assistant Examiner*—Robert Fennema
(74) *Attorney, Agent, or Firm*—Keusey, Tutunjian & Bitetto, P.C.; Mark Wardas

(57) ABSTRACT

A pipeline system and method includes a plurality of operational stages. The stages include a pointer register stage which stores pointer information and updates, and a rename and dependence checking stage located downstream of the pointer register stage, which renames registers and determines if dependencies exist. A functional unit provides pointer information updates to the pointer register stage such that pointer information is processed and updated to the pointer register stage before or in parallel with the register dependency checking.

21 Claims, 5 Drawing Sheets

SYSTEM AND METHOD OF EXECUTION OF REGISTER POINTER INSTRUCTIONS AHEAD OF INSTRUCTION ISSUE

BACKGROUND OF THE INVENTION

1. Field of the Invention

The present invention relates to processor flow, and more particularly to processor pipelines and methods, which provide pointer instructions ahead of instruction issuance.

2. Description of the Related Art

The demand for performance in general-purpose microprocessors and digital signal processors (DSPs) has made the ability to perform multiple computations per cycle an essential feature of the architecture. Two common approaches to the execution of multiple computations per cycle used in modern microprocessors include Instruction-Level Parallelism (ILP) and Data-Level Parallelism (DLP).

Instruction-Level parallelism occurs at the operation level when two or more operations are data-independent from one another and may be executed concurrently. Data-level parallelism occurs when the same operation is executed on each member of a set of data.

A common way to exploit the data-level parallelism is to implement a Single Instruction Multiple Data (SIMD) Architecture. Here, single operations are specified in the instruction stream, but each operation is performed on multiple data elements. For the general SIMD case, these data elements may come from, and be written back to, disjoint locations. Current SIMD implementations (such as IBM VMX™ or Intel MMX™), however, do not allow this level of data flexibility. Instead, multiple data elements for SIMD operations are packed into a single register, often called a SIMD vector register.

Each instruction causes an operation to be performed on all elements in its source registers, and there is only one input data stream. On the other hand, an indirect-SIMD architecture, (such as the one described in J. Moreno et. al. "An innovative low-power high-performance programmable signal processor for digital communications", IBM Journal of Research and Development, volume 47, number 2/3, 2003 pp. 299-326), provides access to disjoint data values via register pointers.

Rather than explicitly specifying vector elements in the SIMD instruction word, indirect-SIMD instructions have vector pointer source and destination fields, wherein each vector pointer specifies multiple indices. Data elements are accessed indirectly through statically specified pointers, and physical vectors are composed at execution-time based upon dynamic values in vector pointer registers.

The indirect access to the register file provides flexibility for data manipulation. For example, instead of moving data from one location in the register file to another, it is sufficient to redirect the corresponding register pointer.

In SIMD engines, the indirect access to the register file allows the programmer to specify a vector of several elements that do not necessarily reside in contiguous locations in the register file. However, the application of the indirect register file access mechanism is not limited to SIMD architectures. It also allows accessing register files with a large, and even variable number of entries, using less than log 2(N) bits in the instruction word to specify the operands, which may be a useful feature for either SIMD or scalar engines.

The indirect register file access mechanism has been disclosed in the following documents: U.S. Pat. Nos., 6,687,808, 6,052,766, 5,974,524, 5,890,222, 3,946,366, and described in papers by J. Moreno at. al., "An innovative low-power high-performance programmable signal processor for digital communications", IBM Journal of Research and Development, volume 47, number 2/3, 2003 pp. 299-326) and H. Hunter, "A New Look at Exploiting Data Parallelism in Embedded Systems", CASES, 2003.

Referring to FIG. 1, a prior art pipeline 10 of a processor with the indirect register file access is shown. A front end 12 of the pipeline includes instruction storage access and instruction decode with optional branch prediction. Following the front end 12 is an optional stage 14 where instructions are checked for dependencies and other stall conditions. This stage 14 may not be present in exposed pipeline processors, where it is the programmer's responsibility to resolve any stall conditions. At an issue stage 16, instructions ready for execution are forwarded to the appropriate execution engines for execution. The execution engine(s) provides pointer register file 18 (or a single pointer register) access, to read (or generate) one or more indices for read and write operands for all instructions issued in the same cycle. In other words, the execution engines do a mapping of the register pointer value to a physical register, and the contents of the physical register are used for the operation.

Then, the read indices read from the pointer file 18 are used to access a register file 20 for instruction operands, and the write indices are used to write the results back into the register file 20.

A set of pointer functional units (FUs) 24 is provided to execute instructions updating a (or at least one) pointer register (or multiple pointer registers) in the pointer register file 18. Various forms of pointer update instructions are described in the prior art, including incrementing pointers using a specific stride and/or using modulo arithmetic. Pointer registers 18 can also be updated by regular functional units 22, including, for example, a memory unit, or data transfer from the register file 20. In one example, vector pointers can be automatically updated to implement a circular addressing within a range of the register file.

One deficiency of the prior art implementation of the indirect register access mechanism is that no checking is performed for register dependencies between instructions (that is, dependencies through registers in the register file 20). These dependencies cannot be checked before the pointers are accessed, because the values of indexes to the register file 20 are not known at the dependence checking stage, and different pointers may point to the same entry in the register file (i.e., aliasing problem).

In the prior art, it is the responsibility of the programmer or compiler to schedule instructions in such a way that there are no register dependencies between instructions.

Therefore, a need exists for a system and method for execution of register pointer instructions, which provides flexibility to the programmer and avoids the aliasing problems of the prior art.

SUMMARY OF THE INVENTION

A pipeline system and method includes a plurality of operational stages. The stages include a pointer register stage which stores pointer information and updates, and a register dependence checking stage (and optional rename stage) located downstream of the pointer register stage, which determines if dependencies between register operands exist (and optionally renames the registers). A functional unit (or multiple functional units) provides pointer information updates to the pointer register stage such that pointer information is processed and updated to the pointer register stage before the instruction goes through the dependency checking, issue, register file access and execution stages, or in parallel to the dependency checking, issue, register file access and execution stages. This makes the updates to the pointer file available to the following instructions with low latency (the latency could be as low as a single cycle), resulting in a reduced frequency of bubbles (or reduced number of unused issue slots) in instruction sequences with frequent inter-instruction dependencies through register pointers. An additional mechanism is provided to maintain the architected state of the register pointers, allowing implementation of precise exceptions.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides systems and methods for improving parallel data/instruction flow in a pipeline. Pointer information is forwarded to locations in the pipeline to run parallel operations during a single cycle time.

By applying the systems and methods of the present invention, greater flexibility is afforded to a programmer or pipeline designer, since instruction order and dependencies become less of an issue. This permits the focus of the programmer to shift to other problems or issues while still maintaining a high level of performance, even for codes where there is a high frequency of inter-instruction dependencies through the pointer registers. This high performance level is achieved by minimizing the number of stalls and/or unused instruction issue slots between such dependent instructions. The precise pointer file mechanism of the present invention permits the support of precise exceptions with low performance and hardware overheads.

It should be understood that the elements shown in the FIGS. may be implemented in various forms of hardware, software or combinations thereof. Preferably, these elements are implemented in a combination of hardware and software in one or more appropriately programmed general-purpose processors and memory systems, which include input/output interfaces.

Figure 2:
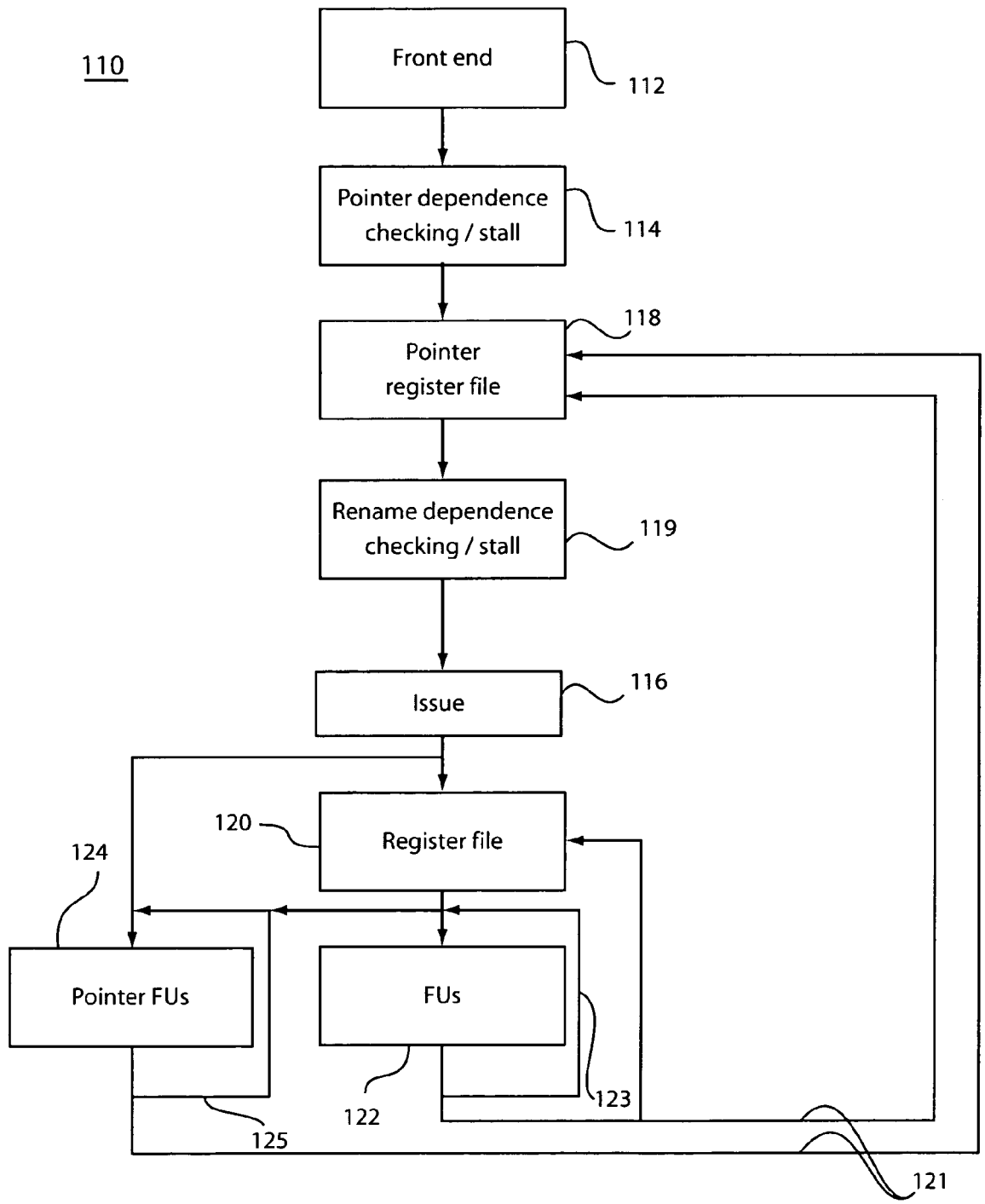
FIG. 2 is a block/flow diagram showing a pipeline having a dependency checking stage (and optional rename stage) located downstream of a pointer register file in accordance with one embodiment of the present invention.

Referring now to the drawings in which like numerals represent the same or similar elements and initially to FIG. 2, one embodiment of the present invention includes a pipeline 110. Pipeline 110 may be implemented in a microprocessor, digital signal processor or any other system or device, which includes instruction or data flow. Pipeline 110 includes a front end 112, which may include instruction storage access and instruction decode with optional branch prediction mechanisms. Front end 112 represents an input or lead-in stage, which may be provided with pipeline 110. A pointer register access stage includes stages 114 and 118. Stage 114 is used to check instructions for dependencies through pointer registers (such as read-after-write, write-after-write and write-after-read dependencies), and stall instructions as needed, if unresolved dependencies through pointer registers exist. A pointer register file stage 118 is used to access the storage (for example, an array) that includes the pointer registers (or possibly just a single pointer register). A stage 119 is advantageously included after the pointer register access stage (stages 114 and 118), that is, after the indexes into the register file 120 are available.

Stage 119 uses the values of register file indexes to check instructions entering stage 119 for dependencies through registers (such as, read-after-write, write-after-write and write-after-read dependencies), and stall the issue of instructions if there are unresolved dependencies, which prevent the instructions from getting correct values for the operands from the register file 120 or an execution bypass 123 (or 125). Notice that both stages 114 and 119 perform checking on instructions for inter-instruction dependencies, and stall the pipeline as necessary to resolve the dependencies. The difference between stages 114 and 119 is that stage 114 checks for inter-instruction dependencies through pointer registers stored in pointer register file 118, whereas stage 119 checks for inter-instruction dependencies through registers stored in the register file 120 (such as general purpose registers, floating point registers, vector registers, media registers, condition registers, machine state registers and so on).

Register renaming may be optionally included in stage 119, in such a way that every result generated by any instruction is allocated a new entry in the register file 120, e.g., is renamed to a new register. Register renaming resolves the write-after-write and write-after-read hazards (or dependencies) without stalling the instruction issues. Renaming of index (pointer) registers or pointers may also be performed in stage 114.

Because stage 119 provides checking for register dependencies and optional register renaming after the register indexes or names for input and output register operands have been read from the pointer register file 118 (or generated using values read from the pointer register file 118), the dependency checking and optional renaming is performed correctly regardless of the register aliasing. For example, suppose an instruction A is ahead of an instruction B in the program order, and suppose instruction A uses pointer register P1 as an index to write the computed value into the register file 120, whereas instruction B uses a different pointer register, say P2, as an index to access one of its input operands from the register file 120. Further, suppose that both pointers P1 and P2 (which are stored in the pointer register file 118) include the same index, pointing to entry R5 in the register file 120. This means that for the correct execution of the program instruction B needs to use as its input operand the value generated by instruction A.

Figure 1:
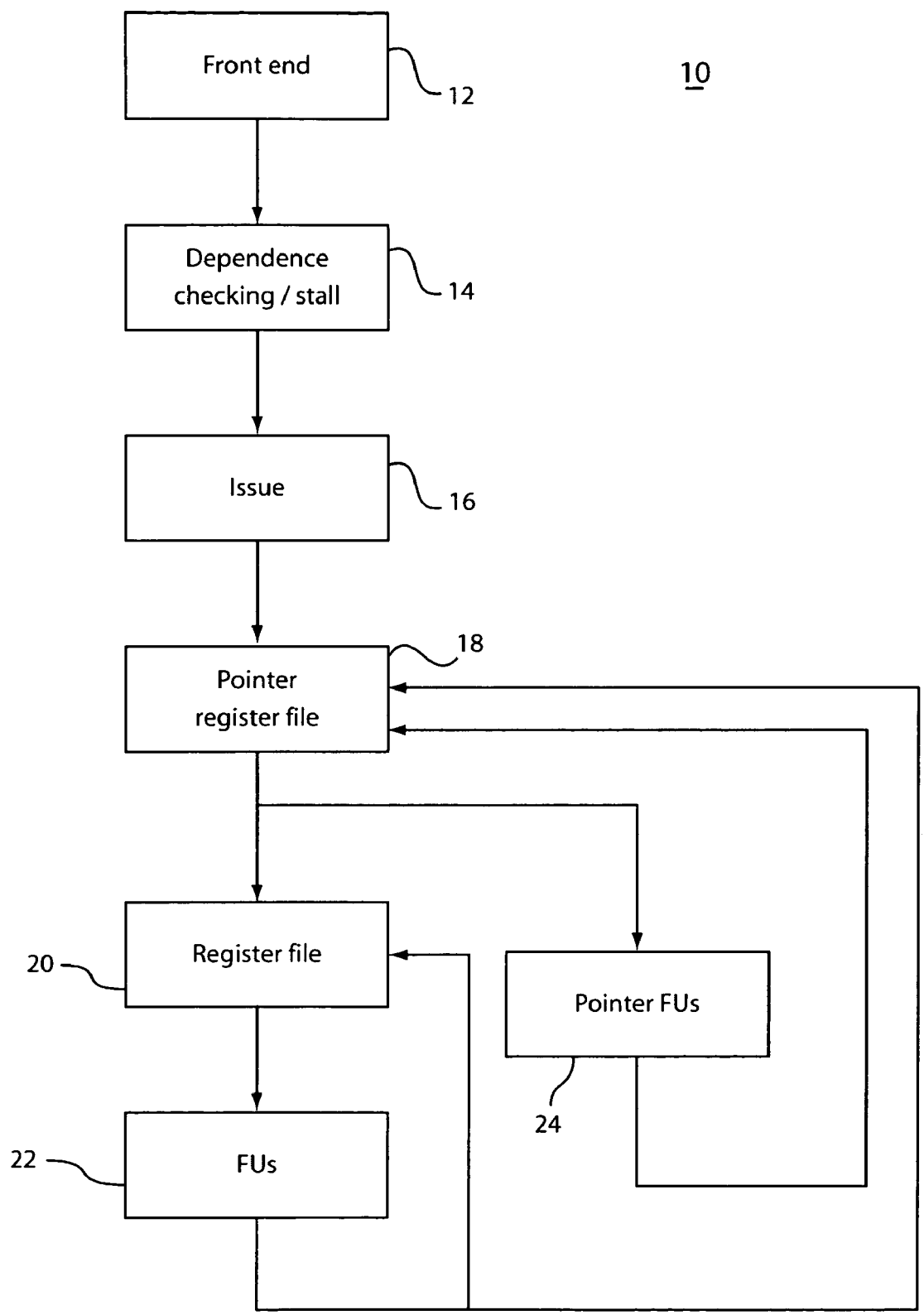
FIG. 1 is a block/flow diagram showing a prior art pipeline for issuing instructions.

The prior art implementation in FIG. 1 cannot detect this dependency between instructions A and B, because the dependency checking is done before the pointer register file 118 is accessed (that is before it is known that both pointers P1 and P2 point to the same location in register file 120). While instruction B goes through the pointer dependency checking logic 114, all information available about instruction B is that it uses pointer P2 as an input operand, and pointer P2 is not being updated by instruction A. The issue logic in the implementation on FIG. 1 may issue instructions A and B in consecutive cycles (or even in the same cycle). If the computation of the result of instruction A takes multiple cycles, instruction B will read a dated value for operand R5, instead of the value computed by instruction A, which will result in an incorrect execution of the program.

The dependency checking mechanism of the present invention shown in FIG. 2 will detect the dependency between instructions A and B in stage 119, and will stall the issue of instruction B for a number of cycles, sufficient for instruction A to compute the result and save the result in the register file 120, or make it available to instruction B through the execution bypass 123 (or 125). In this way, register aliasing problems are solved.

At an issue stage 116, instructions ready for execution (e.g., instructions whose operands are available either in the register file 120 or through the execution bypass 123 (or 125)) are forwarded to the appropriate execution engines for execution. The execution engine(s) provides access to the register file 120, to read input operands for all instructions issued in the same cycle, and one or more execution units 122 to perform operations on input operands, and a write access to the register file 120 to save the computed values. Values read from the pointer register file (or a single pointer register) are used as indices to access the register file 120 for both read and write operation. An execution bypass 123 may be implemented to provide data forwarding between dependent instructions. Examples of functional units include logical unit, adder, shifter, rotator, memory access, and so on.

A separate set of pointer functional units 124 may be implemented to perform operations on pointer registers, read from the pointer register file 118. These units (FUs) 124 execute instructions updating pointer register 118. Various forms of pointer update instructions may be employed. Execution bypass 123 or 123 and 125 may be implemented to provide data forwarding between dependent instructions.

Pointer registers 118 can also be updated by regular functional units 122, including, for example, a memory access unit, or data transfer from the register file 120. In this case, the computed value may be sent to the pointer register file through link 121. In one example, pointers can be automatically updated (possibly with a specified stride and modulo) to implement a circular addressing within a range of the register file.

Instructions updating register pointers flow through the pipeline 110 with other instructions, these instructions may write updated values into pointer register file 118 through link 121 during the write back stage. Updated pointer values may be available to a following instruction through bypass link 125.

The embodiment shown in FIG. 2 may be subject to loss of performance in some instances. For example, if instruction C updates a register pointer, and instruction D immediately following instruction C uses the same register pointer, then instruction D will be stalled in the pointer dependence checking/stall stage 114, until instruction C is executed. Since the pointer dependence checking/stall stage 114 and the pointer execution stage 124 are separated by at least two to three stages (e.g., the pointer register file access stage, dependency checking stage 119 and issue stage 116), there are at least two to three cycles of stall whenever an instruction updating a pointer is immediately followed by an instruction using the same pointer. This is overcome by the embodiment shown in FIG. 3.

Figure 3:
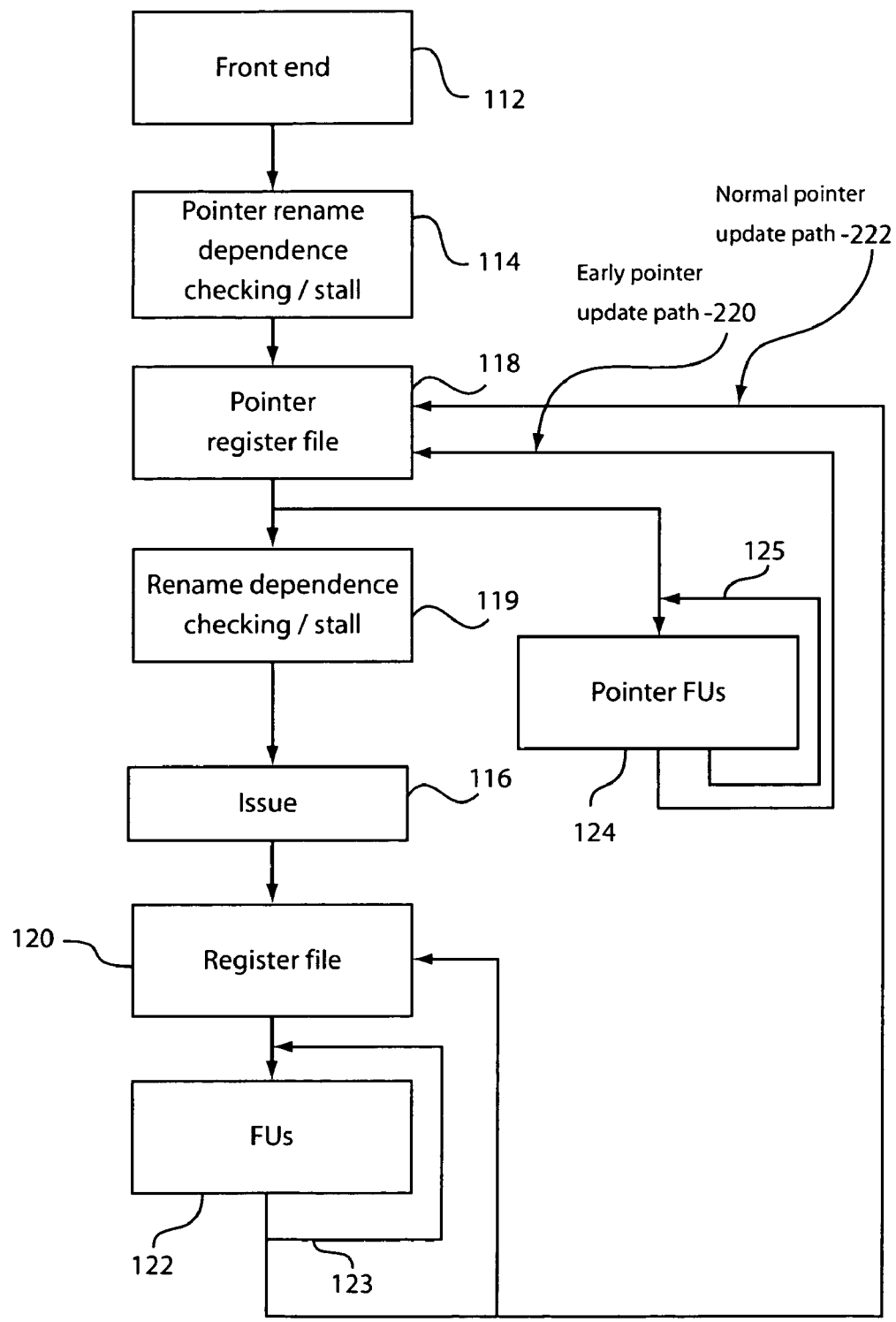
FIG. 3 is a block/flow diagram showing the pipeline of FIG. 2 having a pointer execution stage after the pointer register file access stage and in parallel to (or before) the register dependency checking (with optional register renaming) and stall stage in accordance with another embodiment of the present invention.

Referring to FIG. 3, another embodiment of a pipeline 210 in accordance with the present invention is illustratively shown with improved performance. The pointer execution stage 124 is moved ahead of the register dependence checking/stall stage 119, e.g., instructions are sent to pointer functional unit or units 124 before the register dependency checking is performed. In this implementation, the computation on pointer value in pointer units 124 may proceed in parallel to the register dependency checking and stall logic 119. Most instruction updating register pointers use an "early update" path 220 to make updated values of register pointers available to instructions, which follow a current instruction.

Path 220 may include a pointer execution bypass 125 which makes the computed pointer value available to the immediately following instruction before the pointer values have been written into the pointer register file 118. The pointer instructions using pointer functional units 124 may include all pointer auto-update micro-operations (e.g., a part of an instruction responsible for updating the pointer) and instructions operating on pointers directly, without requiring access to data memory or the register file.

The updated value of the pointer may be forwarded or sent to the immediately following instruction through a bypass 125) so that there is no bubble between an instruction that updates a pointer using the "early update" path 220 and an immediately following instruction that uses that pointer. An optional pointer rename stage (not shown, but similar to block 114) can be added to eliminate stalls due to the pointer write-to-write and pointer write-to-read dependencies between instructions. The pointer renaming logic assigns a new name (e.g., the location in the pointer register file) to every new value generated by any instruction updating one or more pointer registers.

Not all instructions updating pointers use the "early update" path 220. In some embodiments, instructions calculating pointers using values read from the register file 120 and data memory use a "normal update" path 222 (e.g., the update path shown in FIG. 2).

It should be noted that if pointer updates take only one cycle, the pointer dependency checking logic 114 only needs to check for pointer dependencies against instructions going through the longer pipeline (e.g., 120, 122) that use path 222 to update the pointer file 118. The pointer dependency checking logic can therefore be significantly simplified.

The embodiment shown in FIG. 3 may not support precise exceptions, because values are written into the pointer register file 118 out of order with respect to other instructions (e.g., ahead of instructions writing values into the register file 120), and before exceptions are resolved. For example, suppose an instruction A is ahead of an instruction B in the program order, and instruction A updates the register file 120, whereas instruction B updates the pointer register file 118 using the "early update path" 220. It can be seen from FIG. 3 that because the pointer update path is much shorter than the register update path, instruction B may update the pointer register file 118 before instruction A completes. If instruction A completes with an exception, precise state may be lost because of the updates made by instruction B. The embodiment in FIG. 4 addresses this issue.

Figure 4:
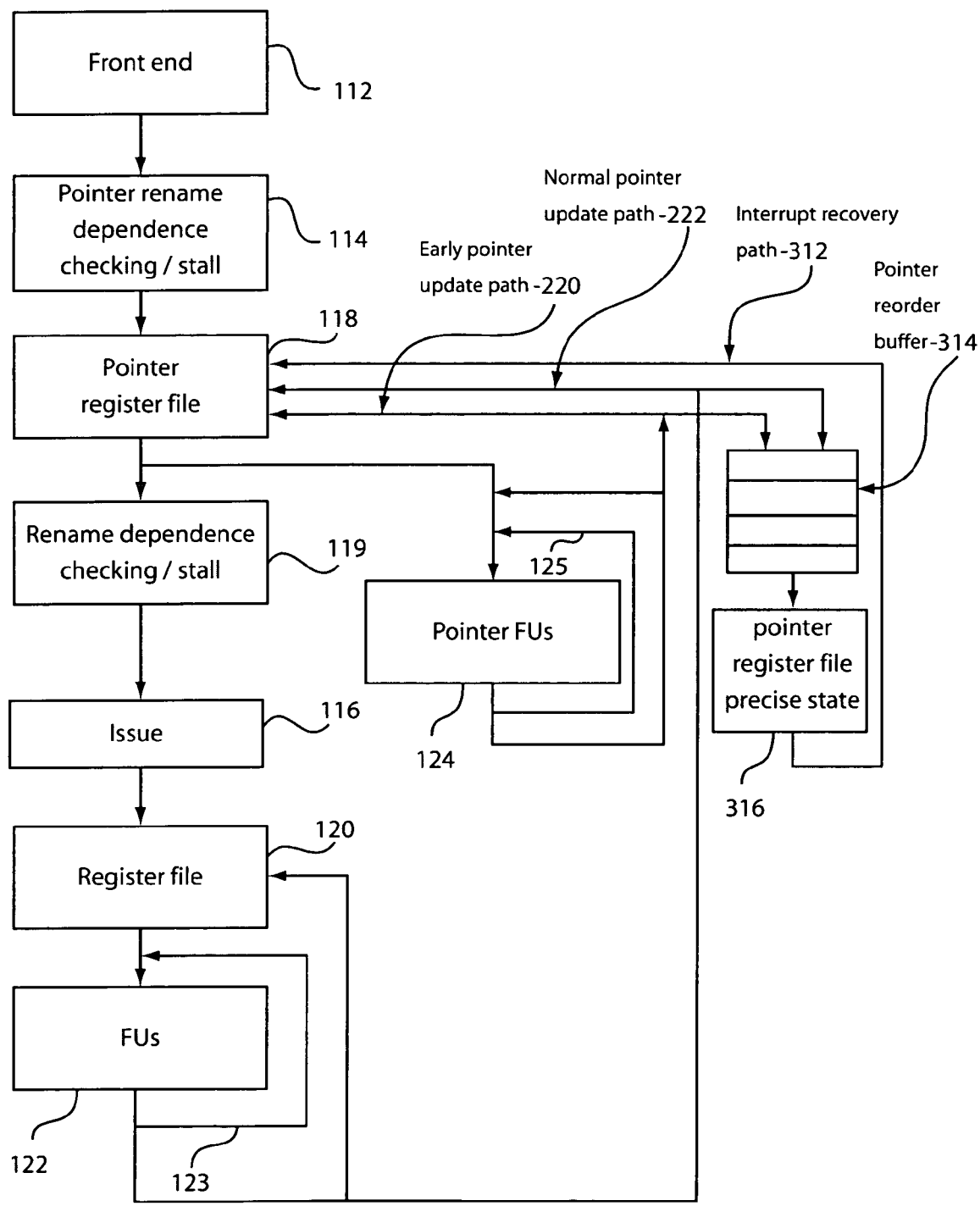
FIG. 4 is a block/flow diagram showing the pipeline of FIG. 3 having a pointer reorder buffer and a precise state pointer register file for handling exceptions in accordance with another embodiment of the present invention.

Referring to FIG. 4, another embodiment of the present invention is illustratively shown, which includes a pipeline 310 that supports precise exceptions. A processor implementing precise exceptions has a mechanism to precisely restore the architectural state to the values, which would apply immediately prior to the occurrence of an exception (e.g., prior to the exception of a given instruction), allowing the execution to resume without any side effects after the exception has been processed. The most common exception, which needs restoring the precise architectural state, is a memory page fault. The precise exception mechanism may also be used to recover the processor from branch mispredictions and other miss-speculations.

The embodiment shown in FIG. 4 includes an "early update" path 220 used by most instructions that update pointers. However, the pointer file 118 includes an imprecise state because it is updated out of order with respect to the state updated by instructions that go through the regular execution pipeline 122.

An example of an out of order update of the pointer register file resulting in a loss of the precise state is given earlier (at the end of the description of the previous embodiment of FIG. 3). Therefore, to restore the precise architected state, in the embodiment shown in FIG. 4, the contents of the pointer register file 118 are discarded whenever an exception occurs. A pointer reorder buffer 314 and precise pointer file 316 are added to maintain the precise state. The pointer reorder buffer 314 holds the value generated by any instruction updating the pointer register file until this instruction is past the exception resolution point (for example, it is the oldest instruction in the pipeline and it completed successfully).

After that the value from the pointer reorder buffer is written to the precise pointer file 316. Precise pointer file 316 includes an interrupt recovery path 312, which is used to restore the contents of the pointer register file 118 to the precise state in the precise pointer file 316. Other implementations of a precise exception support mechanism are possible, such as, e.g., but not limited to check pointing a pointer rename table, a history file, a checkpoint/restore scheme, etc.

Figure 5:
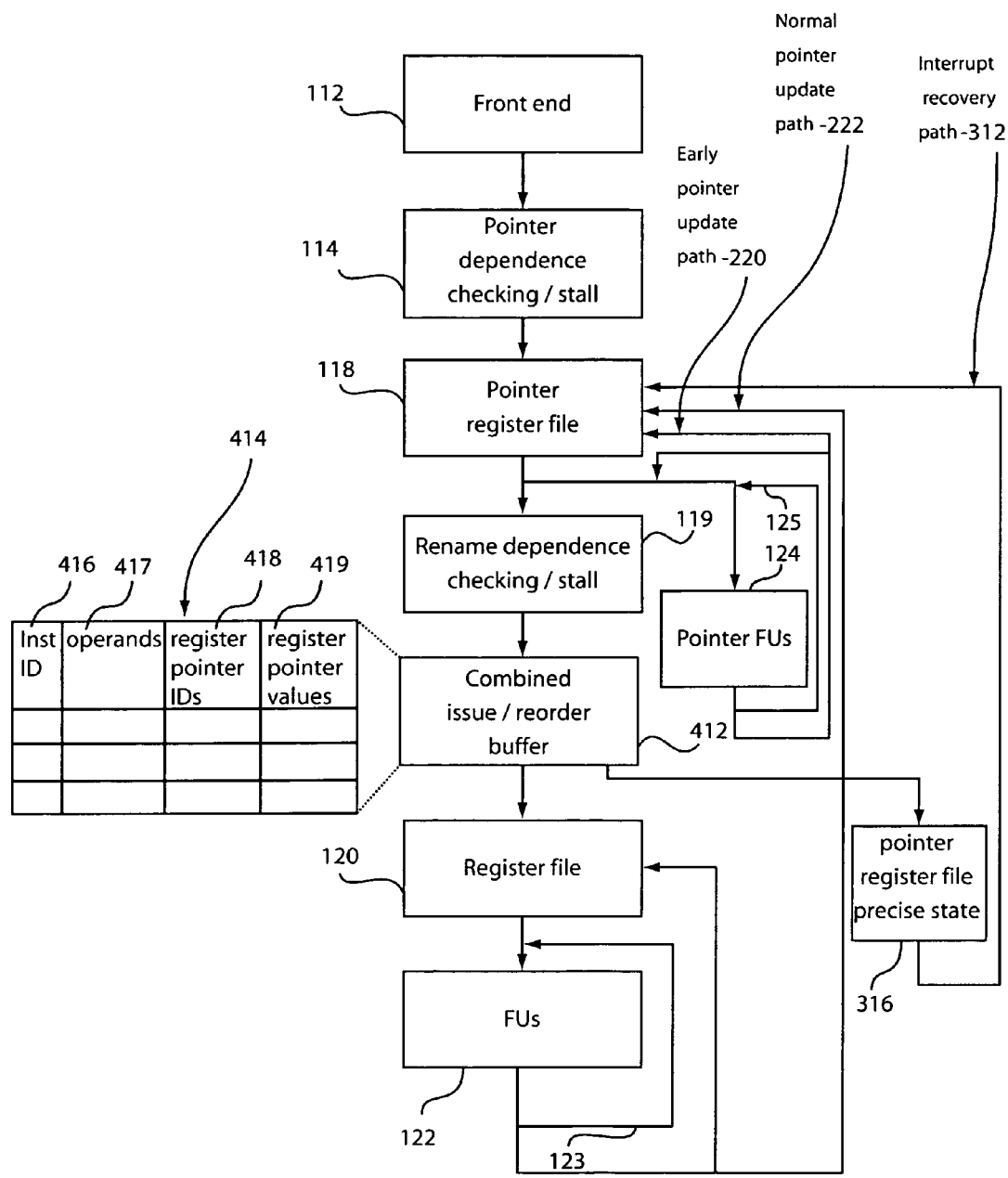
FIG. 5 is a block/flow diagram showing a pipeline having a combined issue and pointer reorder buffer, a pointer execution stage after the pointer register file access and in parallel to the register dependency checking stage, and the precise state pointer register file in accordance with another embodiment of the present invention.

Referring to FIG. 5, another embodiment of the present invention that supports precise exceptions using a modified issue buffer 412 and precise pointer file 316 is illustratively shown. An issue buffer 412 is modified to keep the order of updates to pointer file 118. A sufficient number of fields 416-419 in a table 414 are added to keep the identifiers of all pointers that are updated by an instruction, and the new values of the updated pointers. Whenever an instruction enters the issue stage 412, a new entry is allocated in the combined issue reorder buffer 412. Pointer update instructions that do not use the execution pipeline 412-120-122, are also allocated entries in the issue reorder buffer 412 in their program order. Entries in the combined issue reorder buffer are maintained valid after instructions are issued for execution and until instructions retire.

As soon as a new value is calculated for a pointer register (either in one of functional units 124 or 122), it is written to the pointer file 118, and optionally made available to instructions, which follow through the bypass 125), and also written to the corresponding entry in the combined issue reorder buffer 412. The combined issue reorder buffer 412 keeps entries for instructions that update pointers until they are committed (e.g., past the exception point and the oldest instruction in the pipeline).

When an instruction commits, the values (one or more) of the pointers updated by this instruction are written to precise pointer file 316. The precise pointer file 316 is copied to the pointer file 118 whenever an exception occurs, or other recovery condition, such as branch misprediction or other type of miss-speculation, is detected.

In one embodiment, register pointer data is stored jointly with the instruction data. In yet another embodiment, logically linked data are stored in separate files. In one preferred embodiment, bypassing may occur from vector register numbers and future value data buffered in the pipeline.

The embodiments illustratively described herein permit pipelines or other process flow structures to simultaneously process instructions updating one of the register files (such as general purpose register file, floating point register file, vector register file, condition registers and so on) and instructions updating the pointer register file. By providing write back loop and renaming registers, current pointer assignments are tracked and kept current. This permits greater flexibility in providing instruction orders. This, among other things, reduces program time, improves instruction flow and reduces stall time.

Having described preferred embodiments of a system and method of execution of register pointer instructions ahead of instruction issue (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A pipeline, comprising:
    a plurality of operational stages, the stages including:
        a pointer register stage which stores pointer information and updates in a pointer register file;
        a pointer dependency checking stage located upstream of the pointer register stage, which determines if instruction pointer dependencies exist and stalls an instruction if necessary to resolve inter-instruction dependencies in the pointer register stage;
        a dependence checking stage located downstream of the pointer register file and configured to perform checking on instructions and stalling an instruction if necessary to resolve inter-instruction dependencies in an instruction register file;
        an issue stage located downstream from the dependence checking stage;
        the instruction register file configured to store instruction information and updates:
        at least one pointer functional unit providing pointer information updates directly to the pointer register stage and/or directly to an input of the at least one pointer functional unit as a pointer bypass such that the pointer information is processed and updated; and
        at least one instruction functional unit providing information updates directly to the instruction register stage and/or directly to an input of the at least one instruction functional unit as an instruction bypass such that instruction update information is processed and updated and wherein instructions updating the instruction register file and instructions updating the pointer register file are simultaneously processed to track and keep current pointer and dependency updates between instructions.

2. The pipeline as recited in claim 1, wherein the at least one pointer functional unit is located between the pointer register stage and the dependence checking stage such that inter-instruction dependency is checked after the at least one pointer functional unit or in parallel with pointer execution.

3. The pipeline as recited in claim 2, further comprising a path for making pointer updates available to the pointer register stage before the instruction reaches a write back stage of the pipeline.

4. The pipeline as recited in claim 3, wherein the path includes a normal pointer update path which returns pointer information from the at least one pointer functional unit.

5. The pipeline as recited in claim 1, wherein the pointer bypass makes pointer updates available to immediately following instructions before a pointer update is written into the pointer register file.

6. The pipeline as recited in claim 2, further comprising a pointer reorder buffer coupled to the pointer register stage to maintain a precise state of pointers.

7. The pipeline as recited in claim 6, further comprising a precise pointer file for storing the precise state of the pointer reorder buffer.

8. The pipeline as recited in claim 7, further comprising an interrupt recovery path which keeps the pointer register stage tip to date with reordering or recovery information from the precise pointer file.

9. The pipeline as recited in claim 1, further comprising a combined pointer reorder buffer/issue stage coupled to the dependence checking stage to issue instructions and maintain a precise state/order of pointers.

10. The pipeline as recited in claim 9, wherein the combined pointer reorder buffer/issue stage includes a table with a plurality of fields to keep identifiers of all pointers that are updated by an instruction, and new values of the updated pointers.

11. The pipeline as recited in claim 9, further comprising a precise pointer file for storing the precise state of the combined pointer reorder buffer/issue stage.

12. The pipeline as recited in claim 11, further comprising an interrupt recovery path, which restores the pointer register stage to the precise state from the precise pointer file.

13. A method for updating pointers ahead of an instruction, comprising the steps of:
providing a plurality of operational stages, including a pointer register stage which stores pointer information and updates in a pointer register file, a pointer dependence checking stage located upstream of the pointer register stage, which determines if instruction dependencies exist and stalls an instruction if necessary to resolve inter-instruction dependencies in the pointer register stage, a dependence checking stage located downstream of the pointer register file and configured to perform checking on instructions and stalling an instruction if necessary to resolve inter-instruction dependencies in an instruction register file configured to store instruction information and updates, an issue stage located downstream from the dependence checking stage, and at least one pointer functional unit providing pointer information updates directly to the pointer register stage and/or directly to an input of the at least one pointer functional unit as a pointer bypass, and at least one instruction functional unit providing information updates directly to the instruction register stage and/or directly to an input of the at least one instruction functional unit as an instruction bypass; and
processing instruction dependency information and pointer information to update the instruction register stage and the pointer register stage so that instructions updating the instruction register file and instructions updating the pointer register file are simultaneously processed to track and keep current pointer and dependency updates between instructions.

14. The method as recited in claim 13, further comprising a step of providing pointer updates to the pointer register stage via an early pointer update path by providing the at least one pointer functional stage between the pointer register stage and the dependence checking stage.

15. The method as recited in claim 14, further comprising a step of maintaining a precise state of pointers by employing a pointer reorder buffer.

16. The method as recited in claim 15, further comprising a step of storing the precise state of the pointer reorder buffer in a precise pointer file.

17. The method as recited in claim 15, further comprising updating reordering or recovery information from the precise pointer file using an interrupt recovery path to the pointer register stage.

18. The method as recited in claim 14, further comprising maintaining a precise state/order of pointers using a combined pointer reorder buffer/issue stage coupled to the dependence checking stage.

19. The method as recited in claim 18, wherein the combined pointer reorder buffer/issue stage includes a table with a plurality of fields, and keeping identifiers of all pointers that are updated by an instruction, and new values of the updated pointers in the fields.

20. The method as recited in claim 18, further comprising storing the precise state of the combined pointer reorder buffer/issue stage using a precise pointer file.

21. The method as recited in claim 20, further comprising providing an interrupt recovery path which keeps the pointer register stage up to date with reordering or recovery information from the precise pointer file.

* * * * *

UNITED STATES PATENT AND TRADEMARK OFFICE
CERTIFICATE OF CORRECTION

| | | |
|---|---|---|
| PATENT NO. | : 7,325,124 B2 | Page 1 of 1 |
| APPLICATION NO. | : 10/828794 | |
| DATED | : January 29, 2008 | |
| INVENTOR(S) | : Erik Altman et al. | |

It is certified that error appears in the above-identified patent and that said Letters Patent is hereby corrected as shown below:

Column 9, Claim 8, Line 32, delete "tip" and substitute -- up --

Signed and Sealed this

Twentieth Day of May, 2008

JON W. DUDAS
*Director of the United States Patent and Trademark Office*